3,826,825
FUNGUS RESISTANT COMPOSITION

James Patrick Dowd and James C. Hunter, Houston, Tex., assignors to Napko Corporation, Houston, Tex.
No Drawing. Filed Mar. 13, 1972, Ser. No. 234,396
Int. Cl. A01n 11/00
U.S. Cl. 424—145                                              1 Claim

ABSTRACT OF THE DISCLOSURE

An improved mildew inhibitor for paint capable of protecting either latex or solvent based paint from unsightly fungus growth. These compositions are prepared by mixing finely divided zinc powder with pyrogenic aluminum oxide.

---

This invention relates to a new and improved fungus inhibitor composition. The inhibitor compositions of this invention are particularly useful in preventing unsightly fungus growth on the surface of latex based house paint.

It is well known that houses painted with ordinary latex based house paint quickly become dark and unsightly due to fungus growth on the surface of the paint. Attempts to control the growth of fungus by the addition of chemicals having fungistatic properties have been generally unsuccessful.

Mercury containing chemicals such as mercuric chloride, phenylmercuric oleate and phenylmercuric propionate have been used as fungicides in paint for many years. It has been found that these compounds lose their effectiveness after a few months of exterior exposure. In addition, these compounds have been found to be highly toxic to all forms of life.

Other compounds have been proposed as fungus inhibitors, such as 2,3,5,6-tetrachloro (methyl sulphonyl) pyridine and 2-(4'-thiazoxyl) benzimidazole, but these compounds generally suffer early loss of effectiveness when exposed to the elements due to being decomposed by ultraviolet light.

The use of zinc oxide and other zinc compounds as mold inhibitors is well known. However, these are generally ineffective in areas where high concentrations of fungus spores are found. In addition zinc and zinc oxide cause gellation of most types of latex paints. Metallic zinc presents an effective surface for retarding the growth of fungus. It is therefore advantageous to incorporate metallic zinc into a coating, preferably as a powder. However, metallic zinc powder cannot be incorporated into water containing latex paint without causing gellation or excessive thickening.

Unexpectedly, we have found that when mixtures of pyrogenic aluminum oxide and zinc powder are made and these mixtures are incorporated into latex paint; such paints are capable of inhibiting the growth of fungus for extended periods of time. The stability of these paints are unaffected either during storage or after the paint has dried.

The aluminum oxide used in this invention has a predominantly gamma crystal structure. It is prepared by the hydrolysis of aluminum chloride in a flame process. It typically has an average particle diameter of .03 micron. When suspended in water having a pH below 9.1, each particle has a net positive charge. Examples of commercial materials which are suitable are *Alon* made by the Cabot Corporation or *Baymol* produced by Du Pont.

The metallic zinc powders of this invention are generally prepared by the condensation of zinc vapor. The particles are generally spherical in shape and may vary in size from .01–20 microns in diameter. However, other particle shapes are permissible.

In the practice of this invention a dispersion of the aluminum oxide in water is prepared. The metallic zinc powder is then added and stirred vigorously. While we do not wish to be bound by theory, it is thought that the negatively charged zinc particles are surrounded by the much smaller, positive charged, particles of aluminum oxide. When incorporated into a paint, the coating of aluminum oxide regulates, but does not prevent the dissolution of the fungicidal zinc ions from the metallic zinc particle. The continual availability of fresh metallic zinc ions extends the mildewcide effect over long periods. The ratio of aluminum oxide to zinc powder can vary widely. If the paint to be protected from fungus infection contains water as a solvent then the aqueous aluminum oxide dispersion can be added directly to the paint. The zinc aluminum dispersion does not effect the color or durability of latex paints in which it is incorporated.

EXAMPLE 1

This example illustrates the preparation of the fungus inhibitor composition of this invention in powdered form.

|  | Lbs. |
|---|---|
| Baymol colloidal alumina | 5 |
| Water | 95 |
| Zinc powder (average particle diameter—6 microns) | 100 |

The water was charged into a stainless steel vessel equipped with a high speed agitator. The agitator was started and the colloidal alumina was slowly sifted into the water. The agitation was continued for ten minutes after the addition of the colloidal alumina was complete. The zinc powder was then added to the resulting alumina dispersion. The mixture was agitated for another ten minutes. The agitator was then turned off. The coated zinc was allowed to settle to the bottom of the vessel. The supernatant liquid was poured off. The coated zinc powder was dried in an oven for 24 hours at 40° C.

EXAMPLE 2

This example illustrates the incorporation of this invention into a latex paint.

|  | Lbs. |
|---|---|
| Hydroxyethylcellulose solution (2% in water) | 250 |
| Ethylene glycol | 25 |
| Triton X–100 (Rohm & Haas) | 6 |
| Potassium tripolyphosphate | 3 |
| Rutile titanium dioxide | 200 |
| Anatase titanium dioxide | 50 |
| Calcium carbonate | 70 |
| Fungus inhibitor composition of Example 1 | 30 |
| Mica | 25 |
| Water | 73 |
| Polyvinyl acetate latex | 395 |
| Balab antifoam agent | 2 |
| Texanol coalescing agent | 5 |

All ingredients except the polyvinyl acetate, antifoam agent and coalescing agent were dispersed for twenty minutes using a high speed *Cowles* disperser. The remaining ingredients were then mixed. The resulting paint had excellent mildew inhibitive properties.

This paint was applied to a house. After 4½ years, no mold could be detected on its surface. Another paint, identical in combination but lacking the fungus inhibitor composition of this invention was heavily infested with mold.

EXAMPLE 3

Ths example illustrates the preparation of the fungus inhibitor composition of this invention in slurry form.

|  | Lbs. |
|---|---|
| Alon colloidal alumina | 1 |
| Water | 16 |
| Zinc powder | 100 |

The same mixing procedure was used as in example 1 but, in this case, a viscous slurry was obtained. This prevented settling of the zinc slurry prior to addition to the paint.

EXAMPLE 4

This example illustrates the incorporation of this invention into a latex paint.

| | Lbs. |
|---|---|
| Hydroxyethyl cellulose solution (2% in water) | 250 |
| Ethylene glycol | 25 |
| Triton X-100 (Rohm & Haas) | 6 |
| Potassium tripolyphosphate | 3 |
| Rutile titanium dioxide | 200 |
| Anatase titanium dioxide | 50 |
| Calcium carbonate | 70 |
| Fungus inhibitor composition of Example 3 | 25 |
| Mica | 25 |
| Water | 73 |
| Polyvinyl acetate | 395 |
| Balab antifoam | 2 |
| Texanol coalescing agent | 5 |

This paint was found to be fungus free after 4 years exterior exposure at Houston, Tex.

What is claimed is:

1. A mildewicidal aqueous dispersion of particulate solids consisting of water, from about 0.855% to 2.5% pyrogenic alumina, said alumina having a positive electric charge, and from 50% to about 85.5% of finely divided zinc powder.

References Cited

UNITED STATES PATENTS

| | | | |
|---|---|---|---|
| 2,540,209 | 2/1951 | Nikitin | 424—157 |
| 2,769,716 | 11/1956 | Rankin | 424—145 |
| 3,494,727 | 2/1970 | Rapaport | 106—15 AF |
| 3,507,676 | 4/1970 | McMahon | 106—15 AF |
| 3,598,627 | 8/1971 | Klimboff | 106—15 AF |

OTHER REFERENCES

Chem. Abst. *64*, 11442e (1966), Almiro Anstalt. "Anticorrosive and Antifouling Paint for Ships."

*Protective and Decorative Coating*, ed., J. J. Mattiello, volume II, pp. 369–374, John Wiley & Sons, Inc., New York, N.Y. (1942).

*Technology of Paints, Varnishes and Lacquers*, C. R. Martens, pp. 354–356 (1968), Reinhold Book Corp., New York.

ALBERT T. MEYERS, Primary Examiner

D. W. ROBINSON, Assistant Examiner

U.S. Cl. X.R.

424—157; 106—15 AF